H. SOMMERS AND S. SCHERAGA.
HAND TOOL.
APPLICATION FILED APR. 16, 1919.
1,315,644.
Patented Sept. 9, 1919.
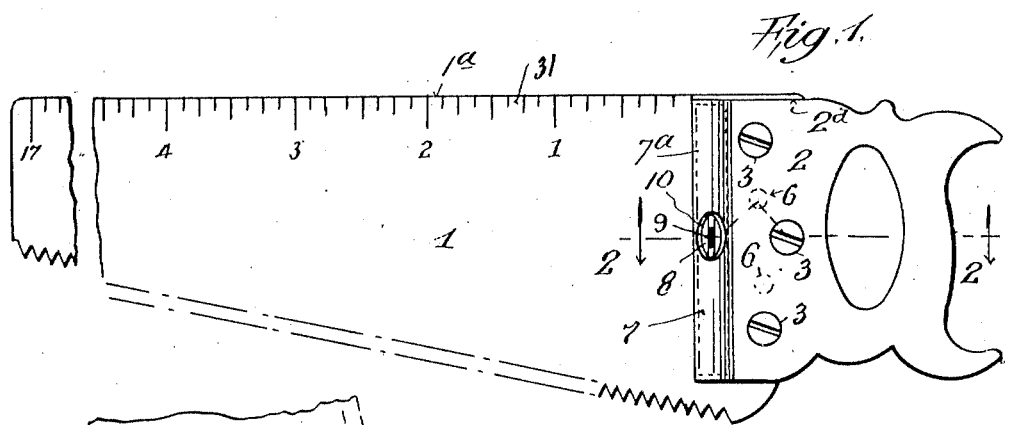
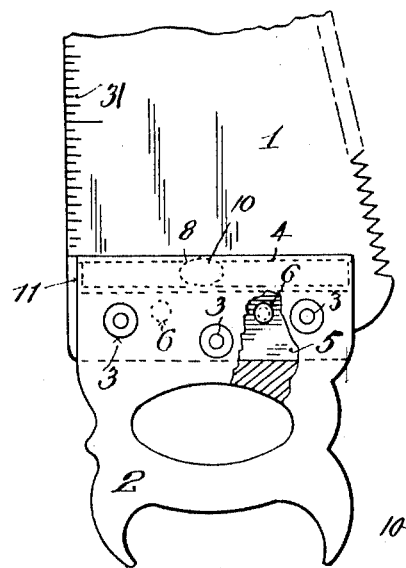
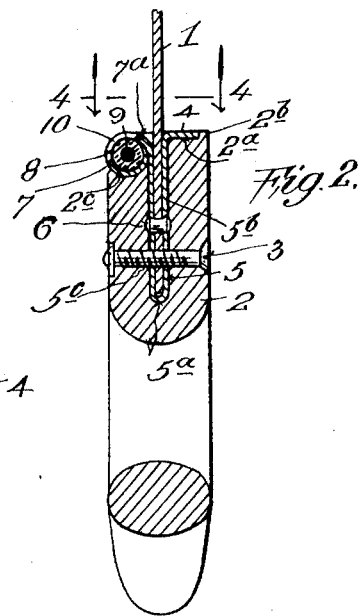
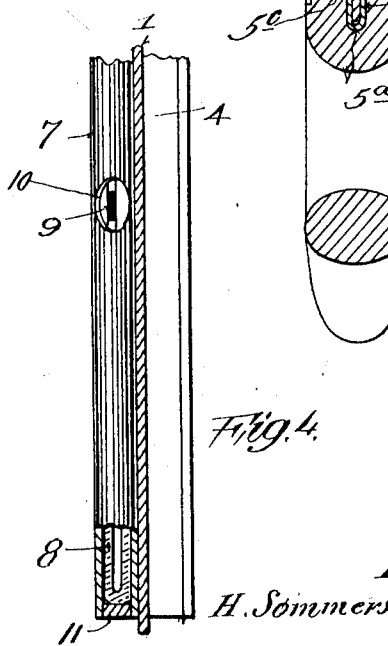
Inventors
H. Sommers & S. Scheraga
by their atty
T. F. Bourne

UNITED STATES PATENT OFFICE.

HERMAN SOMMERS, OF NEWARK, NEW JERSEY, AND SAMUEL SCHERAGA, OF NEW YORK, N. Y.

HAND-TOOL.

1,315,644.      Specification of Letters Patent.      Patented Sept. 9, 1919.

Application filed April 16, 1919. Serial No. 290,401.

*To all whom it may concern:*

Be it known that we, HERMAN SOMMERS, a subject of the King of Roumania, and resident of Newark, county of Essex, and State of New Jersey, and SAMUEL SCHERAGA, of New York, county of Kings, and State of New York, have invented certain new and useful Improvements in Hand-Tools, of which the following is a specification.

The object of our invention is to provide a saw with graduations or a scale for measuring located on one or both sides along the straight back edge, as well as to provide the saw with means to enable it to serve as a carpenter's square, and also to provide a saw with means for determining horizontal surfaces, such as commonly called a carpenter's level, whereby a tool may be equipped with four instrumentalities customarily provided in separate tools.

Our invention comprises novel details of improvement that will be more fully hereinafter set forth and then pointed out in the claims.

Reference is to be had to the accompanying drawings forming a part hereof, wherein—

Figure 1 is a side view of a saw embodying our improvements;

Fig. 2 is an enlarged section substantially on the line 2—2 of Fig. 1;

Fig. 3 is a view from the opposite side of Fig. 1; and

Fig. 4 is a section substantially on the line 4—4 of Fig. 2.

Similar numerals of reference indicate corresponding parts in the several views.

The saw blade is indicated at 1 and its handle at 2, which parts may be secured together in any ordinary manner, such as by screws or rivets 3. The back edge 1ª of the saw blade is straight to serve as a rule or straight edge and on one or both sides along said edge the blade is provided with graduations or scale 31 to indicate measurement of inches or the like. At 4 is a straight-edge shown projecting laterally from blade 1 and at a perfect right angle to the edge 1ª transversely thereof. Said straight-edge 4 is shown in the form of a web or flange secured to blade 1, which web is shown projecting from a metal plate 5 placed flat against the smooth portion of the saw blade and secured thereto, preferably immovably by rivets 6. The plate 5 is shown set with blade 1 in a slot or recess in the handle 2, and thereby is secured to the handle with the blade. The straight edge or flange 4 is shown set in a recess 2ª in the adjacent edge of handle 2 providing a portion 2ᵇ of the handle adjacent to and protecting the outer edge of web or flange 4, so that the latter will not become bent or dislocated from injury. At 7 is indicated, generally, a carpenter's level, shown comprising a sheet of metal coiled at its edge in tube-like form at 7ª receiving a tube 8 containing liquid having an air bubble, indicated at 9, which may be in the customary form of a tube of fluid of a carpenter's level or the like. The coiled portion 7ª has an opening 10 through which said bubble may be seen for leveling purposes. The ends of the tubular coiled portion 7ª may be closed by plugs indicated at 11 for retaining the tube 8 therein. The coiled portion 7ª of the level is shown extending from plate 5 which is bent at 5ª providing two parallel portions 5ᵇ, 5ᶜ on opposite sides of the heel of the saw blade, both of which portions are shown secured to the blade by rivets 6. This construction enables the plate 5 with the web or flange 4 and coiled portion 7ª of the carpenter's level to be of one piece of material so that said parts may be made accurately to retain their relation. The coiled portion 7ª is shown set in a recess 2ᶜ in the edge of handle 2, whereby the level is protected and kept from displacement. The working face of the web or flange 4 and the operating face of the carpenter's level are on a straight line or plane so that both such surfaces may be utilized for squaring purposes. Instead of making the portions 5ᵇ and 5ᶜ in a single piece it will be understood that said portions may be made in separate pieces, so that one has web or flange 4 and the other has coiled portion 7ª for the tube 8, which portions will be secured to the saw blade in rectangular relation to the straight edge 1ª thereof. Also, the tubular part 8 may be separate from plate 5ᶜ and secured thereto.

By means of our improvements a person may utilize the saw in a well known manner for sawing, and may use the straight edge 4 in conjunction with the edge 1ª of the blade back for squaring and for measuring purposes in the nature of a carpenter's square, as well as the straight edge of the tubular portion 7ª for the same purpose, and he may utilize the level for determining the horizontal relations of surfaces, either in conjunction with the straight edge 4 or with the straight edge 1ª of the saw back. The handle 2 is shown at 2ᵈ slightly at a distance from the adjacent edge 1ª so that the handle will not interfere with the use of said straight edge when the latter is used along a wall or the like for leveling.

While we have illustrated the straight edge 4 on one side of the saw blade and the level on the other side thereof combined in one instrument, it is apparent that such instrument may be made with either the straight edge 4 or the level alone if preferred.

Our improvements are simple in construction, not liable to get out of order and enable a person to perform at least four different operations with a single instrument usually requiring several different instruments.

Our invention is not limited to the details of construction and arrangement of parts set forth but may be varied, within the scope of the appended claims, without departing from the spirit of our invention.

Having thus described our invention, what we claim and desire to secure by Letters Patent is:—

1. A hand tool comprising a saw blade having a straight back edge and a straight edge extending laterally transversely of the blade at right angles to the first-named edge, the tool having a handle secured to the blade and provided with a recess receiving said transverse straight edge, the material of the handle at the outer part of said recess protecting the outer edge of said straight edge.

2. A hand tool comprising a saw blade having a straight back edge and a plate riveted upon the side of said blade and having a coiled portion extending along the blade and provided with a laterally disposed opening, a tube containing fluid and an air bubble within said coiled portion, and a handle secured to said blade, said handle having a recess at its forward edge outside of the blade receiving said tubular portion.

3. A hand tool comprising a saw blade having a straight back edge, a sheet of metal bent to form two members located respectively on opposite sides of the heel of the blade and secured thereto, one of said members having a web extending laterally at right angles to the blade and the other member having a coiled portion on the opposite side of the blade extending at right angles to said web, a tube within said coiled portion containing fluid and an air bubble, a handle having a recess receiving the heel of the blade and said plates, and means securing the handle thereto.

Signed at Newark, county of Essex and State of New Jersey, this 12 day of April, 1919.

HERMAN SOMMERS.
SAMUEL SCHERAGA.

Witness to signatures:
A. COHEN.